United States Patent [19]

Koshugi

[11] 4,304,905

[45] Dec. 8, 1981

[54] METHOD FOR PREPARING A CARBOXYALKYLATED CHITIN AND A DERIVATIVE THEREOF

[75] Inventor: Junichi Koshugi, Tokyo, Japan

[73] Assignee: Kureha Kagaku Kogyo Kabushiki Kaisha, Tokyo, Japan

[21] Appl. No.: 104,399

[22] Filed: Dec. 17, 1979

[30] Foreign Application Priority Data

Dec. 29, 1978 [JP] Japan .................................. 53/161391

[51] Int. Cl.³ .............................................. C08B 37/08
[52] U.S. Cl. ...................................................... 536/20
[58] Field of Search ........................................... 536/20

[56] References Cited

U.S. PATENT DOCUMENTS

| | | | |
|---|---|---|---|
| 2,040,879 | 5/1936 | Rigby | 536/20 |
| 2,072,771 | 3/1937 | Rigby | 536/20 |
| 2,670,329 | 2/1954 | Jones | 536/20 |
| 2,842,049 | 7/1958 | Delangre | 536/20 |
| 3,251,824 | 5/1966 | Battisla | 536/20 |
| 4,027,068 | 5/1977 | Saad | 536/20 |
| 4,195,175 | 5/1980 | Peniston et al. | 536/20 |

Primary Examiner—Johnnie R. Brown
Attorney, Agent, or Firm—Wegner & Bretschneider

[57] ABSTRACT

Disclosed herein a method for preparing carboxyalkylated chitin from chitin and a method for preparing a de-acetylated substance of the carboxyalkylated chitin.

13 Claims, No Drawings

METHOD FOR PREPARING A CARBOXYALKYLATED CHITIN AND A DERIVATIVE THEREOF

BACKGROUND AND DETAILED DESCRIPTION OF THE INVENTION

The present invention relates to a method for preparing a water-soluble derivative of chitin, and specifically relates to a method for preparing a carboxyalkyated chitin and a de-acetylated substance of the carboxyalkylated chitin.

Chitin is a kind of mucopolysaccharides contained in large quantities in crustaceans and insects. Although chitin is a potentially useful substance, owing to its strong chemical resistance due to its stable crystalline structure it has no good solvents and so it has no actual usefulness as it is.

As for the solvent of chitin, for instance, dichloroacetic acid, sulfuric acid and formic acid are known. However, these solvents cause the reduction of molecular weight, and the decomposition of chitin and their handling is very much troublesome, and particularly these solvents are accompanied with environment-pollution problems. Accordingly, it is considered that in the event of finding a derivative of chitin which is soluble in a simple solvent, for instance, water or an aqueous solution of an acid, an alkali or a neutral salt, its handling becomes easy and the industrial usefulness will be increased.

The object of the present invention is to offer an industrially useful derivative of chitin, which is soluble in water.

Hitherto, carboxyalkylation has been known as a method for preparing a water-soluble derivative of chitin. One of the most excellent procedures of carboxyalkylation is that of Trujillo (Carbohydro. Res. 7, 483, 1968). According to Trujillo, a sodium salt of a carboxymethylated chitin is prepared as follows: after leaving a mixture of chitin and dimethylsulfoxide (DMSO) to stand for one day, the mixture is crushed to be a pulpy state and after removing an excess DMSO, the crushed substance is washed with ethanol and dried. The dried substance is crushed into powder and is added to an aqueous sodium hydroxide solution of high concentration. After agitating and filtering the mixture, the cake-like residue is pressed to remove an excess sodium hydroxide to obtain a cake of chitin. The cake is added to a mixture of isopropyl alcohol and chloroacetic acid under agitation. After agitating well, the mixture is filtered to obtain a filtrate. The whole filtrate is neutralized and the neutralized filtrate is passed through a filter packed with glass-wool. Acetone is added to the thus treated filtrate and the deposited sodium salt of carboxymethylated chitin is collected by filtration, washed with ethanol and then dried. However, the above-mentioned method is not practical because of the numerous pre-treatments for producing the carboxymethylated chitin, and also there is a disadvantage of the difficulty of etherization because of the insufficient dissociation of micells of chitin crystallite.

The inventor has studied on the carboxyalkylation of chitin with etherifying agents under the swelling of chitin-micells by reasonable techniques. As a result, it was found by the inventor that (1) by freezing a highly concentrated aqueous alkali solution containing chitin, the micell of chitin may be swelled to caused the easy carboxyalkylation in the following step, (2) the step of filtration of the aqueous alkali solution and of the step of pressing the filtration-residue for the removal of an excess sodium hydroxide as pre-treatment are unnecessary, and (3) the addition of an organic solvent containing the etherifying agent to the frozen chitin containing alkali under agitation gives the carboxyalkylated chitin at a high yield.

The followings are the detailed explanation of the invention.

The chitin used as the raw material in the present invention is the product obtained by a publicly known method from natural substances containing chitin. After crushing the chitin, it is immersed and then penetrated in an aqueous alkali solution of a normality of 10 to 15. The alkali used in the present invention is sodium hydroxide, potassium hydroxide of lithium hydroxide. The amount of the aqueous alkali solution is 3 to 5 times by weight of the weight of chitin, and the temperature of the penetration is lower than the room temperature, preferably of 5° to 20° C.

In the next step, the mixture is frozen at a temperature of $-3°$ to $-30°$ C., preferably of $-10°$ to $-20°$ C. for a preferable time of 3 to 24 hours. The degree of swelling the micell of chitin is determined by taking up a small amount of the specimen and dissolving it in a small amount of an iced water to see the uniformity of the thus obtained solution. Because in the case of fully swelled micell, the solution is uniform with dispersed chitin.

In cases where the concentration and the amount of the alkali are out of the above-mentioned range, the micells only partially swell and give an opaque and not-uniform solution. That is, in the case of insufficient amount of the alkali, the alkali solution does not possibly penetrate into the particles of chitin sufficiently, and on the other hand, in the case of too much of the amount, the solution in the neighbourhood of the surface of chitin particles inhibits the heat-conduction in freezing and the swelling of the micell of chitin. In either case, the sufficient opening of the micell is not expected as a result of inhibited internal swelling. Also, in cases of low concentration of the alkali, the swelling state is not obtained.

In the next step, the frozen chitin containing alkali is dispersed into an organic solvent containing an etherifying agent dissolved in an amount of 1 to 3 times by mole equivalent per unit mole equivalent of a pyranose ring of chitin. The reaction is carried out at a low temperature, preferably at 0°-30° C. for 1 to 72 hours, preferably for 5 to 12 hours. Since in the initial stage of the reaction, there is a generation of heat due to neutralization, it is preferable to maintain the temperature at 0° to 10° C. by external cooling at first, and to continue the reaction thereafter at a pre-determined temperature. After the reaction is over, the organic solvent is removed and the residue is dissolved into water to obtain a uniform solution. After neutralizing the solution and dialyzing the neutralized solution, the fraction containing the object chitin derivative is obtained by fractional precipitation. The object carboxymethylated chitin is obtained by drying the fraction. The agent used for the fractional precipitation is a couple of an alcohol, for instance, methanol or ethanol and acetone.

As for the organic solvent in the reaction of carboxyalkylation in the present invention, for instance, methanol, ethanol, isopropyl alcohol, propanol, acetone and DMSO are used. In using such an organic solvent, since the hydroxyl group of chitin assumes a form of alcoholate by the action of the alkali, there is an advantage of possibly carrying out the carboxyalkylation in the next step as it is.

The etherifying agent used in the present invention is a compound represented by the general formula: $X(CH_2)_nCOOH$, wherein X represents a chlorine atom or a bromine atom; and n denotes an integer of 1, 2 or 3; and, for instance, chloroacetic acid, bromoacetic acid, β-chloropropionic acid, β-bromopropionic acid, γ-chlorobutyric acid and γ-bromobutyric acid are enumerated. By the above-mentioned method, for instance, water-soluble carboxymethylated-, carboxyethylated-, carboxypropylated chitin, etc. are obtained.

The degree of carboxyalkylation obtained by the method of carboxyalkylation of the present invention applied on chitin is variable depending upon the condition of the reaction, and by the method of the present invntion a degree of carboxyalkylation of as high as more than 0.3 is possibly obtained.

Furthermore, the present invention offers a method of producing a water-soluble de-acetylated derivative of carboxyalkylated chitin by treating a carboxyalkylated chitin by an aqueous alkali solution at a high concentration, preferably at a normality of 4 to 15, at a temperature of 65° to 150° C., preferably of 65° to 110° C. for 0.1 to 48 hours thereby de-acetylating the carboxyalkylated chitin.

As a raw material of the above-mentioned de-acetylated derivative, the substance still containing the organic solvents obtained by filtrating the carboxymethylation product in the organic solvent and then washing with ethanol and acetone, the substance obtained by drying the above-mentioned substance still containing the solvents, or the intermediate substance obtained on the way of above-mentioned preparation of the carboxyalkylated chitin, that is, by dissolving the residue in water after the removal of organic solvent may be used.

In the case where the reaction temperature of deacetylation is lower than the above-indicated range, de-acetylation does not proceed sufficiently, and it is not preferable to carry out the reaction at a higher temperature because of the reduction of molecular weight.

In addition, since the carboxyalkyl group is bonded to chitin by an ether bond during the reaction of de-acetylation, the group is not released when the compound is heated in an aqueous alkali solution.

The degree of de-acetylation in the de-acetylated derivative obtained by the method of the present invention is 0.1 to 1, preferably 0.3 to 1.

The water-soluble derivative of chitin and the de-acetylated derivative thereof, both of which are obtained by the present invention are utilizable as an ion-exchange substance, a raw material for edible films, dietary fibers or a bio-adaptable material.

The followings are the concrete explanation of the present invention referring to the non-limiting examples:

EXAMPLE 1

After kneading 20 g of chitin with 65 g of an aqueous 11 N sodium hydroxide solution at a temperature of 15° C., the mixture was frozen at a temperature of =20° C. for 24 hours. The frozen mixture was dispersed into a solution comprising 400 ml of ethanol and 30 g of chloroacetic acid and the mixture was made to react for 2 hours at a temperature of 3° C. and further for 45 hours at a temperature of 20° C. After the reaction was over, the reaction mixture was neutralized and then dialyzed by using a visking tube. The dialyzate is subjected to fractional precipitation by ethanol to give a carboxylated chitin, at a yield of 28 g, the degree of substitution of the product being 0.6 determined by elementary analysis. The presence of a carboxyl group was confirmed by infrared absorption spectroscopy, and the fact that the product had not been subjected to de-acetylation was confirmed by the negativity in colouring purple when treated with iodine in the presence of sulfuric acid.

EXAMPLE 2

Twenty grams of carboxymethylated chitin obtained in Example 1 were treated in 200 g of an aqueous 12.5 N sodium hydroxide solution at a temperature of 100° C. for 3 hours, and the mixture was dissolved into 800 ml of water and then neutralized with a 6 N hydrochloric acid. After dialyzing the neutralized reaction mixture, a precipitate deposited. The dried substance obtained by washing and drying the precipitate was a de-acetylated substance of the carboxymethylated chitin of the weight of 15 g.

EXAMPLE 3

After kneading 50 g of chitin with 200 g of an aqueous 11 N sodium hydroxide solution at a temperature of 15° C., the mixture was frozen for 2 hours at a temperature of −3° C. and further for 24 hours at a temperature of −20° C., and then the frozen mixture was dispersed into an isopropyl alcohol containing 70 g of chloroacetic acid in solution. The dispersion was left to stand for 2 hours at a temperature of 0° C. and further for 24 hours at a temperature of 13° C. to make reaction. After the reaction was over, the reaction mixture was filtered and isopropyl alcohol was removed and then the residue was dissolved into 1,500 ml of water. After the step of neutralization of the solution, the step of dialysis of the neutralized solution and the step of the fractional precipitation of the dialyzate with ethanol, a carboxymethylated chitin with a degree of substitution of 0.7 was obtained at a yield of 75 g.

EXAMPLE 4

After kneading 50 g of chitin with 200 g of an aqueous 11 N potassium hydroxide solution at a temperature of 10° C., the mixture was frozen at a temperature of −3° C. for 2 hours and further at a temperature of −20° C. for 24 hours. The frozen mixture was dispersed into a solution comprising 1000 ml of isopropyl alcohol and 79 g of β-monochloropropionic acid and the mixture was made to react for 2 hours at a temperature of 0° C. and further for 24 hours at a temperature of 15° C. After the reaction was over, the reaction mixture was filtrated, dissolved with 2000 ml of water, neutralized and then dialyzed by using a visking tube. The dialyzate is subjected to fractional precipitation by acetone to give a carboxyethylated chitin, at a yield of 62 g, the degree of substitution of the product being 0.6.

EXAMPLE 5

Twenty five grams of carboxyethylated chitin obtained in Example 4 were treated in 300 g of an aqueous 10 N potassium hydroxide solution at 95° C. for 5 hours and the mixture was dissolved into 1,000 ml of water and the solution was neutralized. By condensing the neutralized solution and dialyzing the condensate, a precipitate deposited. After washing and drying the precipitate, 16 g of a de-acetylated product of the carboxyethylated chitin were obtained.

EXAMPLE 6

After kneading 50 g of chitin with 200 g of an aqueous 11 N sodium hydroxide solution at a temperature of 15° C., the mixture was frozen for 24 hours at a temperature of −15° C. Then the frozen substance was dispersed into an isopropyl alcoholic solution of 88 g of γ-chlorobutyric acid. Then by processing as in Example 4, a carboxypropylated chitin with a degree of substitution of 0.5 was obtained at a yield of 60 g.

EXAMPLE 7

Twenty four grams of the carboxypropylated chitin obtained in Example 6 were treated in an aqueous 14 N sodium hydroxide solution at a temperature of 100° C. for one hour, and the mixture was dissolved into 1,300 ml of water. On the dialysis of the neutralizate of the aqueous solution, a precipitate deposited. After washing and drying the precipitate, 10 g of a de-acetylated product of the carboxypropylated chitin were obtained.

COMPARATIVE EXAMPLE 1

After kneading 20 g of chitin with 80 g of an aqueous 11 N sodium hydroxide solution at a temperature of 15° C., the mixture was left to stand for 24 hours at a temperature of 25° C. After dispersing the mixture into an isopropyl alcoholic solution containing 30 g of chloroacetic acid and leaving to stand for 24 hours at a temperature of 25° C. to make reaction, the reaction mixture was filtered. The insoluble residue was brought into one liter of water, however, a uniform solution could not be obtained but an insoluble matter deposited. After removing the water-insoluble matter by centrifugation, the solution containing the water-soluble matter was neutralized and was subjected to dialysis, and then the dialyzate was condensed to 100 ml. After fractional precipitation of the condensate, the obtained fraction was dried to be a product with a degree of substitution of 0.3 of a yield of 2 g.

COMPARATIVE EXAMPLE 2

Forty grams of chitin were dispersed in 200 ml of dimethylsulfoxide and after leaving the dispersion for 2 hours, it was filtered and the residue was dispersed in 200 ml of dimethylsulfoxide again. After leaving to stand for the additional 2 hours, the mixture was filtered and the residue was washed with ethanol and dried.

After kneading 20 g of the treated chitin as mentioned above with an aqueous 11 N sodium hydroxide solution at a temperature of 15° C., the mixture was left to stand for 24 hours at a temperature of 25° C. and then subjected to the same procedure as in Example 3 to obtain a product with a degree of substitution of 0.4 at a yield of 6 g.

COMPARATIVE EXAMPLE 3

Twenty grams of chitin were kneaded with an aqueous 5 N sodium hydroxide solution at a temperature of 15° C. and the mixture was frozen for 24 hours at a temperature of −30° C. and then subjected to the same treatment as in Example 3 to obtain 2 g of product with a degree of substitution of 0.3.

What is claimed is:
1. A method for preparing a carboxyalkylated chitin, comprising:
   immersing chitin in an aqueous highly concentrated alkali solution;
   freezing the chitin-immersed alkali solution at a temperature of −3° to −30° C.; and
   dispersing the frozen alkali-containing chitin into an organic solvent containing an etherifying agent, thereby to etherify a hydroxyl group of the chitin, said etherifying agent having the following general formula:

$$X(CH_2)_nCOOH$$

wherein X is a chlorine atom or a bromine atom, and n denotes an integer of 1, 2 or 3.

2. The method according to claim 1, wherein the alkali is selected from the group consisting of lithium hydroxide, potassium hydroxide and sodium hydroxide.

3. The method according to claim 1 or 2, wherein the normality of said aqueous highly concentrated alkali solution is 10 to 15.

4. The method according to claim 1, wherein the amount of said aqueous highly concentrated alkali solution is 3 to 5 times by weight of the amount of said chitin.

5. The method according to claim 4, wherein the amount of said aqueous highly concentrated alkali solution is about 4 times by weight of the amount to said chitin.

6. The method according to claim 1, wherein the organic solvent is selected from the group consisting of methanol, ethanol, isopropyl alcohol, propanol, acetone and dimethylsulfoxide.

7. The method according to claim 1, wherein the frozen mixture is dispersed at a temperature of 0° to 30° C.

8. The method according to claim 1, wherein said carboxyalkylated chitin has a degree of substitution by carboxyalkyl group of 0.3 to 0.9.

9. A method for preparing a de-acetylated derivative of the carboxyalkylated chitin obtained by the method according to claim 1, comprising:
   adding said carboxyalkylated chitin into an aqueous alkali solution, thereby de-acetylating said carboxyalkylated chitin.

10. The method according to claim 9, wherein the aqueous alkali solution has a concentration corresponding to the normality of 4 to 15.

11. The method according to claim 9, wherein the carboxyalkylated chitin is de-acetylated at a temperature of 65° to 150° C.

12. The method according to claim 11, wherein the temperature is from 65° to 110° C.

13. The method according to claim 10, wherein the alkali is selected from the group consisting of lithium hydroxide, potassium hydroxide and sodium hydroxide.

* * * * *